United States Patent
Conrad

(10) Patent No.: US 11,229,335 B2
(45) Date of Patent: Jan. 25, 2022

(54) CYCLONIC SURFACE CLEANING APPARATUS

(71) Applicant: Omachron Intellectual Property Inc., Hampton (CA)

(72) Inventor: Wayne Ernest Conrad, Hampton (CA)

(73) Assignee: Omachron Intellectual Property Inc., Hampton (CA)

(*) Notice: Subject to any disclaimer, the term of this patent is extended or adjusted under 35 U.S.C. 154(b) by 1935 days.

(21) Appl. No.: 14/683,026

(22) Filed: Apr. 9, 2015

(65) Prior Publication Data

US 2015/0208885 A1  Jul. 30, 2015

Related U.S. Application Data

(63) Continuation of application No. 12/675,540, filed as application No. PCT/CA2008/001530 on Aug. 28, 2008, now Pat. No. 9,027,201.

(30) Foreign Application Priority Data

Aug. 29, 2007 (CA) ...................................... 2599303

(51) Int. Cl.
*A47L 5/24* (2006.01)
*A47L 9/16* (2006.01)

(52) U.S. Cl.
CPC ................. *A47L 5/24* (2013.01); *A47L 9/165* (2013.01); *A47L 9/1608* (2013.01); *A47L 9/1625* (2013.01); *A47L 9/1658* (2013.01); *A47L 9/1666* (2013.01); *A47L 9/1683* (2013.01)

(58) Field of Classification Search
CPC ......................... A47L 9/1608–1691; A47L 5/24

USPC .................................................. 15/353, 327.2
See application file for complete search history.

(56) References Cited

U.S. PATENT DOCUMENTS

| | | | |
|---|---|---|---|
| 2,071,975 A | | 1/1936 | Holm-Hansen et al. |
| 2,309,583 A | * | 1/1943 | Frantz ...................... A47L 5/12 |
| | | | 15/344 |
| 3,320,727 A | | 5/1967 | Farley et al. |
| 3,582,616 A | | 6/1971 | Wrob |
| 4,373,228 A | | 2/1983 | Dyson |
| 4,826,515 A | | 5/1989 | Dyson |

(Continued)

FOREIGN PATENT DOCUMENTS

| | | |
|---|---|---|
| CN | 1336154 A | 2/2002 |
| CN | 2524655 Y | 12/2002 |

(Continued)

OTHER PUBLICATIONS

English machine translation of JP2009261501, published on Nov. 12, 2009.

(Continued)

*Primary Examiner* — Bryan R Muller
(74) *Attorney, Agent, or Firm* — Philip C. Mendes da Costa; Bereskin & Parr LLP/S.E.N.C.R.L., s.r.l.

(57) ABSTRACT

A surface cleaning apparatus uses an inverted cyclone. An air flow path extends from a dirty air inlet to a clean air outlet. A suction motor is positioned in the air flow path. The inverted cyclone is downstream from the dirty air inlet in a first cyclonic cleaning stage. The cyclone defines a cyclone chamber having a lower air inlet, a lower air outlet and an upper dirt outlet. An openable dirt collection chamber is in communication with the upper dirt outlet.

15 Claims, 13 Drawing Sheets

(56) References Cited

U.S. PATENT DOCUMENTS

| | | |
|---|---|---|
| 5,230,722 A | 7/1993 | Yonkers |
| 5,309,601 A | 5/1994 | Hampton et al. |
| 5,858,038 A | 1/1999 | Dyson et al. |
| 6,210,469 B1 | 4/2001 | Tokar |
| 6,221,134 B1 | 4/2001 | Conrad et al. |
| 6,406,505 B1 | 6/2002 | Oh et al. |
| 6,532,620 B2 | 3/2003 | Oh |
| 6,553,612 B1 | 4/2003 | Dyson et al. |
| 6,560,818 B1 | 5/2003 | Hasko |
| 6,581,239 B1 | 6/2003 | Dyson et al. |
| 6,782,585 B1 | 8/2004 | Conrad et al. |
| 7,073,226 B1 | 7/2006 | Lenkiewicz et al. |
| 7,222,393 B2 | 5/2007 | Kaffenberger et al. |
| 7,381,234 B2 * | 6/2008 | Oh ................... A47L 9/1608 55/318 |
| 7,386,916 B2 | 6/2008 | Bone |
| 7,485,164 B2 | 2/2009 | Jeong et al. |
| 7,488,362 B2 | 2/2009 | Jeong et al. |
| 7,597,730 B2 | 10/2009 | Yoo et al. |
| 7,740,676 B2 | 6/2010 | Burnham et al. |
| 7,887,612 B2 | 2/2011 | Conrad |
| 8,062,398 B2 | 11/2011 | Luo et al. |
| 8,100,999 B2 | 1/2012 | Ashbee et al. |
| 8,444,731 B2 | 5/2013 | Gomiciaga-Pereda et al. |
| 2003/0226232 A1 | 12/2003 | Hayashi et al. |
| 2004/0112022 A1 | 6/2004 | Vuijk |
| 2005/0198771 A1 | 9/2005 | Min et al. |
| 2006/0042038 A1 | 3/2006 | Arnold et al. |
| 2006/0117519 A1 | 6/2006 | Bock et al. |
| 2006/0137304 A1 | 6/2006 | Jeong et al. |
| 2006/0137305 A1 | 6/2006 | Jung |
| 2006/0137307 A1 | 6/2006 | Jeong et al. |
| 2006/0156508 A1 | 7/2006 | Khalil |
| 2007/0067945 A1 | 3/2007 | Kasper et al. |
| 2007/0079586 A1 | 4/2007 | Kim |
| 2007/0130895 A1 | 6/2007 | Boeck et al. |
| 2007/0289264 A1 | 12/2007 | Oh |
| 2008/0104793 A1 | 5/2008 | Kang et al. |
| 2008/0134460 A1 * | 6/2008 | Conrad ................ A47L 9/0027 15/335 |
| 2008/0172992 A1 | 7/2008 | Conrad |
| 2008/0178416 A1 | 7/2008 | Conrad |
| 2008/0256744 A1 | 10/2008 | Rowntreer et al. |
| 2009/0113663 A1 | 5/2009 | Follows et al. |
| 2009/0282639 A1 | 11/2009 | Dyson et al. |
| 2009/0307864 A1 | 12/2009 | Dyson |
| 2010/0045215 A1 | 2/2010 | Hawker et al. |
| 2010/0115727 A1 | 5/2010 | Oh |
| 2010/0139033 A1 | 6/2010 | Makarov et al. |
| 2010/0224073 A1 | 9/2010 | Oh et al. |
| 2010/0229322 A1 | 9/2010 | Conrad |
| 2011/0219570 A1 | 9/2011 | Conrad |
| 2013/0091660 A1 | 4/2013 | Smith |
| 2013/0091661 A1 | 4/2013 | Smith |
| 2013/0091812 A1 | 4/2013 | Smith |
| 2013/0091813 A1 | 4/2013 | Smith |
| 2014/0237768 A1 | 8/2014 | Conrad |
| 2016/0367094 A1 | 12/2016 | Conrad |

FOREIGN PATENT DOCUMENTS

| | | |
|---|---|---|
| CN | 202277306 U | 1/2003 |
| CN | 1911151 A | 2/2007 |
| CN | 1969739 A | 5/2007 |
| CN | 101015436 A | 8/2007 |
| CN | 101108106 A | 1/2008 |
| CN | 101108110 A | 1/2008 |
| CN | 101288572 A | 10/2008 |
| CN | 101489453 A | 7/2009 |
| CN | 101489455 A | 7/2009 |
| CN | 101489457 A | 7/2009 |
| CN | 101489461 A | 7/2009 |
| CN | 101657133 A | 2/2010 |
| CN | 102188208 A | 9/2011 |
| CN | 202173358 U | 3/2012 |
| CN | 103040412 A | 4/2013 |
| CN | 103040413 A | 4/2013 |
| CN | 103169420 A | 6/2013 |
| DE | 3734355 C2 | 6/1989 |
| DE | 10056935 C2 | 1/2003 |
| DE | 10110581 C2 | 11/2003 |
| DE | 60201666 T2 | 6/2006 |
| DE | 102007011457 A1 | 10/2007 |
| DE | 112006003479 T5 | 12/2008 |
| DE | 112007001314 T5 | 4/2009 |
| DE | 112007003039 T5 | 10/2009 |
| DE | 112007003052 T5 | 1/2010 |
| DE | 202011003563 U1 | 5/2011 |
| GB | 2163703 A | 3/1986 |
| JP | 2000140533 A | 5/2000 |
| JP | 2004121722 A | 4/2004 |
| JP | 3656835 B2 | 3/2005 |
| JP | 2009261501 A | 11/2009 |
| JP | 2010227287 A | 10/2010 |
| KR | 1020050013696 A | 2/2005 |
| KR | 1020050054551 A | 6/2005 |
| KR | 1020050091821 A | 9/2005 |
| KR | 1020050091824 A | 9/2005 |
| KR | 1020050091826 A | 9/2005 |
| KR | 1020050091829 A | 9/2005 |
| KR | 1020050091830 A | 9/2005 |
| KR | 1020050091833 A | 9/2005 |
| KR | 1020050091834 A | 9/2005 |
| KR | 1020050091835 A | 9/2005 |
| KR | 1020050091836 A | 9/2005 |
| KR | 1020050091837 A | 9/2005 |
| KR | 1020050091838 A | 9/2005 |
| KR | 1020050103343 A | 10/2005 |
| KR | 1020050104613 A | 10/2005 |
| KR | 1020050104614 A | 11/2005 |
| KR | 1020060008365 A | 11/2005 |
| KR | 1020060018004 A | 2/2006 |
| KR | 1020060119587 A | 11/2006 |
| KR | 1020060125952 A | 12/2006 |
| KR | 1020060125954 A | 12/2006 |
| KR | 1020080029824 A | 4/2008 |
| KR | 1020100121886 A | 11/2010 |
| WO | 00/78546 A1 | 12/2000 |
| WO | 0182767 A1 | 11/2001 |
| WO | 2007/084699 A2 | 7/2007 |
| WO | 200834325 A1 | 3/2008 |
| WO | 2008035032 A2 | 3/2008 |
| WO | 200865168 A1 | 6/2008 |
| WO | 2008135708 A1 | 11/2008 |
| WO | 2009026709 A1 | 3/2009 |
| WO | 2009026714 A1 | 3/2009 |
| WO | 2010102396 A1 | 9/2010 |

OTHER PUBLICATIONS

English machine translation of JP2010227287A, published on Oct. 14, 2010.

English machine translation of KR1020050013696, published on Feb. 5, 2005.

English machine translation of KR1020050054551, published on Jun. 10, 2005.

English machine translation of KR1020050091821, published on Sep. 15, 2005.

English machine translation of KR1020050091824, published on Sep. 15, 2005.

English machine translation of KR1020050091826, published on Sep. 15, 2005.

English machine translation of KR1020050091829, published on Sep. 15, 2005.

English machine translation of KR1020050091830, published on Sep. 15, 2005.

English machine translation of KR1020050091833, published on Sep. 15, 2005.

English machine translation of KR1020050091834, published on Sep. 15, 2005.

(56) References Cited

OTHER PUBLICATIONS

English machine translation of KR1020050091835, published on Sep. 15, 2005.
English machine translation of KR1020050091836, published on Sep. 17, 2005.
English machine translation of KR1020050091837, published on Sep. 18, 2005.
English machine translation of KR1020050091838, published on Sep. 19, 2005.
English machine translation of KR1020050103343, published on Oct. 31, 2005.
English machine translation of KR1020050104613, published on Nov. 3, 2005.
English machine translation of KR1020050104614, published on Nov. 3, 2005.
English machine translation of KR1020060008365, published on Jan. 26, 2006.
English machine translation of KR1020060018004, published on Feb. 28, 2006.
English machine translation of KR1020060119587, published on Nov. 24, 2006.
English machine translation of KR1020060125952, published on Dec. 7, 2006.
English machine translation of KR1020060125954, published on Dec. 7, 2006.
English machine translation of KR1020080029824, published on Apr. 3, 2008.
English machine translation of KR1020100121886, published on Nov. 19, 2010.
English machine translation of WO200865168A1, published on Jun. 5, 2008.
English machine translation of CN1336154A, published on Feb. 20, 2002.
English machine translation of CN1911151A, published on Feb. 14, 2007.
English machine translation of CN1969739A, published on May 30, 2007.
English machine translation of CN101015436A, published on Aug. 15, 2007.
English machine translation of CN101108106A, published on Jan. 23, 2008.
English machine translation of CN101108110A, published on Jan. 23, 2008.
English machine translation of CN101288572A, published on Oct. 22, 2008.
English machine translation of CN101489453A, published on Jul. 22, 2009.
English machine translation of CN101489455A, published on Jul. 22, 2009.
English machine translation of CN101489457A, published on Jul. 22, 2009.
English machine translation of CN101489461A, published on Jul. 22, 2009.
English machine translation of CN101657133A, published on Jul. 22, 2009.
English machine translation of CN102188208A, published on Sep. 21, 2011.
English machine translation of CN103040412A, published on Apr. 17, 2013.
English machine translation of CN103040413A, published on Apr. 17, 2013.
English machine translation of CN103169420A, published on Jun. 26, 2013.
English machine translation of CN202173358U, published on Mar. 28, 2012.
English machine translation of CN202277306U, published on Jun. 20, 2012.
English machine translation of DE10056935C2, published on Jan. 16, 2013.
English machine translation of DE10110581C2, published on Nov. 13, 2003.
English machine translation of DE60201666T2, published on Jun. 1, 2006.
English machine translation of DE102007011457A1, published on Oct. 25, 2007.
English machine translation of DE112006003479T5, published on Dec. 18, 2008.
English machine translation of DE112007001314T5, published on Apr. 23, 2009.
English machine translation of DE112007003039T5, published on Oct. 29, 2009.
English machine translation of DE112007003052T5, published on Jan. 14, 2010.
English machine translation of DE202011003563U1, published on May 19, 2011.
English machine translation of JP3656835B2, published on Mar. 18, 2005.
English machine translation of JP2004121722A, published on Apr. 22, 2004.
Office Action in relation to corresponding Chinese Patent Application No. 200880113799.8 dated Jul. 23, 2012.
Office Action in relation to corresponding Chinese Patent Application No. 200880113799.8, dated Nov. 9, 2011.
Office Action in relation to corresponding Chinese Patent Application No. 200880113799.8, dated Mar. 20, 2013.
Office Action in relation to corresponding Chinese Patent Application No. 200880113799.8, dated Sep. 9, 2013.
Office Action for corresponding Canadian Patent Application No. 2,731,776, dated Jul. 31, 2014.

* cited by examiner

CYCLONIC SURFACE CLEANING APPARATUS

CROSS-REFERENCES TO RELATED APPLICATION

This application is a continuation of co-pending U.S. patent application Ser. No. 12/675,540, which was filed under 35 USC 371 as a national phase entry of International Patent Application No. PCT/CA2008/001530 with a filing date of Feb. 26, 2010, which itself claims the benefit of priority under 35 USC 119 from Canadian Patent Application No. 2,599,303, filed on Aug. 29, 2007, entitled CYCLONIC SURFACE CLEANING APPARATUS WITH EXTERNALLY POSITIONED DIRT CHAMBER, the specifications of each of which are incorporated herein by reference in their entirety.

FIELD

This application relates to surface cleaning apparatus, such as vacuum cleaners.

BACKGROUND

The use of a cyclone, or multiple cyclones connected in parallel or series, is known to be advantageous in the separation of particulate matter from a fluid stream. Currently, many vacuum cleaners, which are sold for residential applications, utilize at least one cyclone as part of the air filtration mechanism.

U.S. Pat. No. 4,826,515 (Dyson) discloses a cyclonic vacuum cleaner having two cyclonic stages, namely a first stage for separating larger particulate matter from an air stream and a second stage for separating finer particulate matter from the same air stream. Each cyclonic stage comprised a single cyclone wherein separated particulate matter was collected in the bottom of the cyclones.

A difficulty experienced with cyclonic separators is the re-entrainment of the separated particulate matter back into the outgoing fluid flow. Deposited particles exposed to a high-speed cyclonic flow have a tendency to be re-entrained. One approach to resolve this issue is to use a plate positioned in a cyclone container to divide the cyclone container into an upper cyclone chamber, which is positioned above the plate, and a lower dirt collection chamber, which is positioned below the plate. See for example Conrad (U.S. Pat. No. 6,221,134). Accordingly, the portion of the cyclone casing below the plate functions as a dirt collection chamber wherein re-entrainment of separated particulate matter is impeded.

SUMMARY

In accordance with this disclosure, a filtration apparatus for a surface cleaning apparatus comprises a cyclone and a dirt collection chamber for the cyclone that is separate from the cyclone, and preferably external to the cyclone chamber. The dirt collection chamber is openable and, when opened, material collected therein may be removed. Similarly, the cyclone is openable. When opened, the cyclone chamber has an absence of any member having a larger diameter than the vortex finder. Therefore, when the cyclone is opened, material collected therein may be also removed. For example, a vortex finder with a large diameter shroud, or a deflector disc positioned around a vortex finder or air outlet, are not located in the cyclone when it is opened and therefore do not create an impediment to dirt falling out of the cyclone when a cyclone is opened and positioned with the opening over a garbage can. Preferably, both the cyclone and the dirt collection chamber are openable at the same time. Preferably, the vortex finder is also removed from the cyclone chamber when the cyclone is opened.

An advantage of this design is that, from time to time, material may accumulate in a cyclone. In some embodiments, the cyclone may be configured such that heavier material is collected in the cyclone itself. For example, the cyclone may be inverted and have an upper dirt outlet. Material that is too heavy to be entrained in an air stream and carried upwardly through the cyclone and through the dirt outlet will accumulate in the cyclone. Accordingly, the interior of the cyclone could be used as a dirt collection chamber. If the dirt collection chamber associated with the cyclone is not the bottom of the cyclone casing, but a separate chamber, then by opening the cyclone, material that collects in the cyclone may be removed, e.g., the opened portion of the cyclone may be held over a garbage can and the accumulated material in the cyclone may be poured out.

Typically, cyclones have an efficiency to separate particulate matter having a targeted size range. By using the interior of the cyclone as a dirt collection chamber, the cyclone may be designed to separate particulate matter having a smaller targeted size range. The material that is disentrained from the airflow by the cyclone and which exits the cyclone dirt outlet may accumulate in a separate dirt collection chamber in flow communication with the cyclone dirt outlet. For example, in a preferred embodiment, the cyclone or the cyclonic cleaning stages combined, may achieve a separation efficiency for IEC dirt as specified as IEC 60312, which is representative of household dirt, of 98% of particles that are from 3 to 5 microns and at least 96.5% of particles that are from 1-2 microns. Such a cyclone, while using a relatively high fluid velocity, may result in heavier or larger material remaining in the cyclone.

Accordingly, for example, a surface cleaning apparatus may include an inverted cyclone having a floor and an upper dirt outlet. A lower air inlet is provided and an air outlet is provided through the floor or a sidewall of the cyclone. In operation, air will enter through the air inlet and cyclone upwardly. Some of the dirt will exit upwardly through the dirt outlet. The air will then travel downwardly and exit the cyclone through the cyclone outlet (e.g., a vortex finder). Some of the dirt will accumulate on the floor of the cyclone. The dirt collection chamber may surround at least a portion of the cyclone and, preferably, all of the cyclone. The dirt collection chamber has a floor on which dirt entering the dirt collection chamber will accumulate. The floor of the cyclone and the floor of the dirt collection chamber may concurrently open so that the dirt collected in the cyclone and the dirt collected in the dirt collection chamber are emptied concurrently. An advantage of this design is that fewer steps are required for a user to empty the dirt collection areas of the vacuum cleaner.

In some embodiments, a vortex finder may be provided on the portion of the cyclone that opens. For example, if the cyclone is inverted, the vortex finder may be positioned on the bottom opening floor of the cyclone. Accordingly, when the cyclone is opened, the vortex finder is removed from the cyclone leaving an open cyclone chamber.

Alternately, or in addition, in some other embodiments, the cyclone may have an interior shroud or screen that may need cleaning from time to time. Accordingly a consumer may use a single step to open the cyclone to access a shroud, filter or screen that requires cleaning or replacement and, at the same time, have access to the dirt collection chamber so as to empty the dirt collection chamber.

In accordance with the instant disclosure, there is provided a surface cleaning apparatus comprising:
(a) a dirty air inlet;
(b) a filtration apparatus comprising a cyclone downstream from the dirty air inlet, the cyclone having a cyclone chamber, a vortex finder, a dirt outlet and a longitudinally extending axis;
(c) an openable dirt collection chamber in communication with the dirt outlet, the dirt collection chamber having an openable end portion that comprises a wall that is intersected by the longitudinally extending axis, and when the end portion is in an open position, the cyclone chamber has an absence of any member having a larger diameter than the vortex finder whereby the dirt collection chamber and the cyclone are concurrently emptyable when the dirt collection chamber is opened;
(d) a suction motor; and,
(e) a clean air outlet downstream from the suction motor.

In any embodiment, the end portion may be pivotally openable.

In any embodiment, the end portion may comprise a dirt collection surface.

In any embodiment, the end portion may be at an end of the dirt collection chamber distal to the dirt outlet.

In any embodiment, the end portion may further comprise the vortex finder.

In any embodiment, the end portion may face the dirt outlet.

In any embodiment, the cyclone may have an openable portion and the end portion of the dirt collection chamber may be openable concurrently with the openable portion of the cyclone.

In any embodiment, the openable portion of the cyclone may comprise a cyclone dirt collection surface, the dirt collection chamber may have a moveable dirt collection chamber surface, and the dirt collection chamber surface may be moveable concurrently with the cyclone dirt collection surface.

In any embodiment, the end portion may comprise a dirt collection surface, the cyclone may have a moveable cyclone dirt collection surface, the moveable cyclone dirt collection surface may be a floor of the cyclone and the dirt collection surface may be a floor of the dirt collection chamber. Preferably, the dirt collection surface and the cyclone dirt collection surface comprise a pivoting bottom of the filtration apparatus.

In some embodiments, the vortex finder is mounted to the cyclone floor.

In any embodiment, the vortex finder may have an upstream end in the cyclone chamber and an absence of any filtration member in covering relationship thereto.

In any embodiment, the dirt collection chamber may be positioned around at least a portion of the cyclone and preferably surrounds the cyclone.

In any embodiment, the filtration apparatus may comprise a plurality of cyclonic cleaning stages and the cyclone comprises a portion of one such stage.

In any embodiment, the cyclone may comprise a first cyclonic cleaning stage and the filtration apparatus may comprise a second cyclonic cleaning stage comprising a plurality of cyclones in parallel.

In some embodiments, the cyclone is inverted and the dirt outlet is in an upper portion of the cyclone. In such an embodiment, the cyclone preferably has a lower air inlet and a lower air outlet.

In any embodiment, the cyclone may have an air inlet at one end of the cyclone and the dirt outlet is provided in a sidewall of the cyclone spaced from the air inlet, the cyclone has an cyclone dirt collection surface that is openable concurrently with the end portion. In such an embodiment, the cyclone preferably has as an upper air inlet and an upper air outlet.

In any embodiment, a filtration member may be positioned downstream from, e.g., beneath, the vortex finder. More preferably, the end of the vortex finder in the cyclone is unobstructed, e.g., there is no screen, shroud or filter overlying or surrounding the inlet to the vortex finder.

It will be appreciated by those skilled in the art that any of these alternate embodiments may be used individually or in combination in a single surface cleaning apparatus, as exemplified in a preferred embodiment described herein, or in any particular sub-combination. Accordingly, any two or more alternate embodiments may be used in a single surface cleaning apparatus.

BRIEF DESCRIPTION OF THE DRAWINGS

These and other advantages of the instant disclosure will be more fully and completely understood in conjunction with the following description of the preferred embodiments of the invention in which.

DETAILED DESCRIPTION

Figure 5:
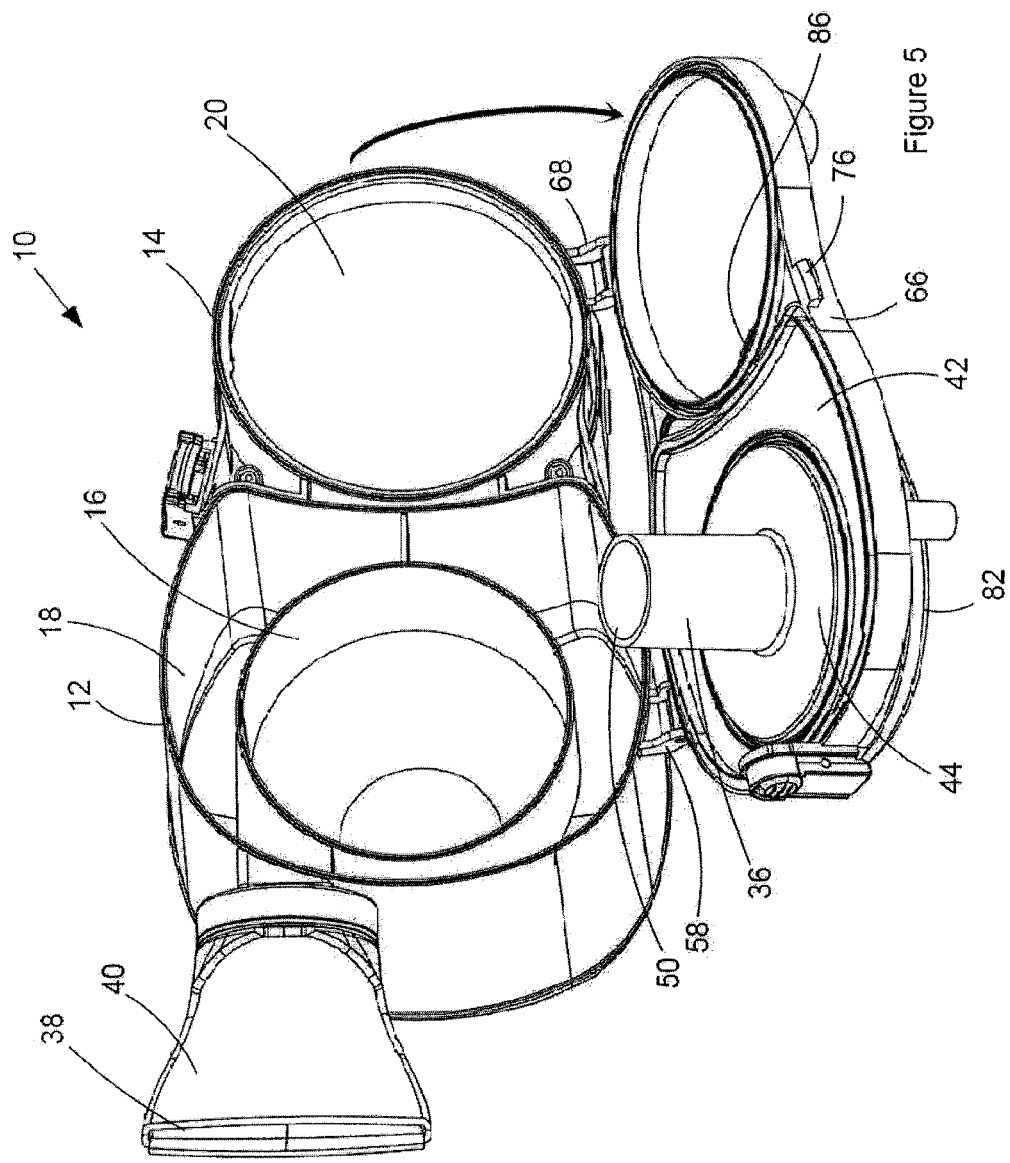
FIG. 5 is a perspective view from the bottom of the vacuum cleaner of FIG. 1 wherein the bottom of the first and second housings is open.
Figure 6:
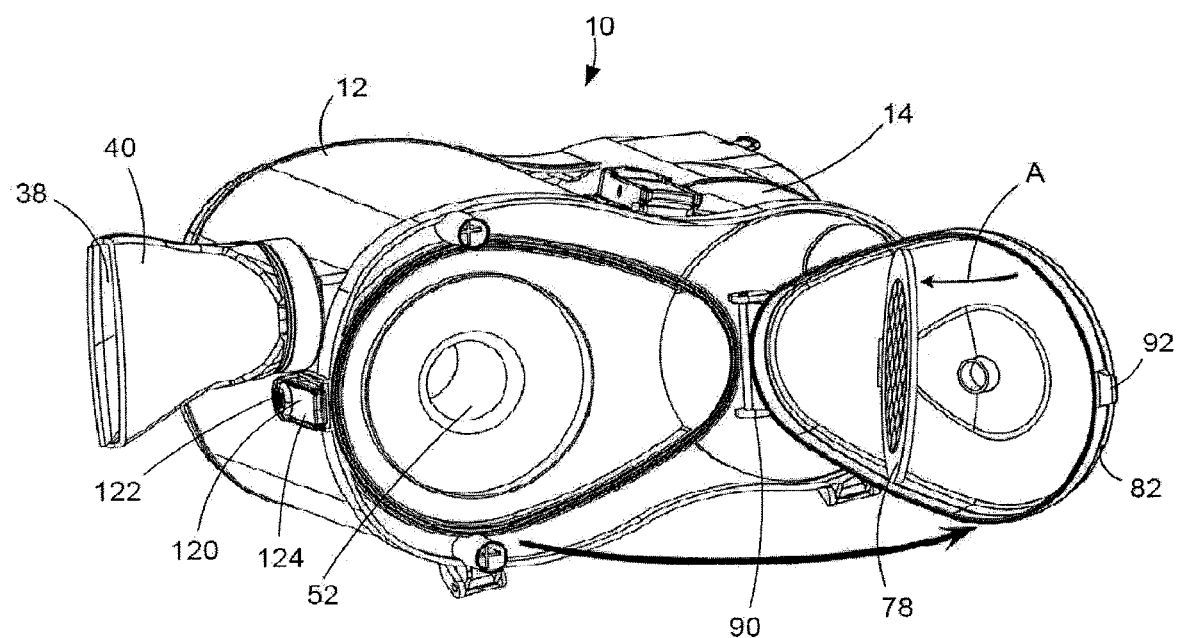
FIG. 6 is a perspective view of the bottom of the vacuum cleaner of FIG. 1 wherein the first and second housings are closed but an access door is open.
Figure 7:
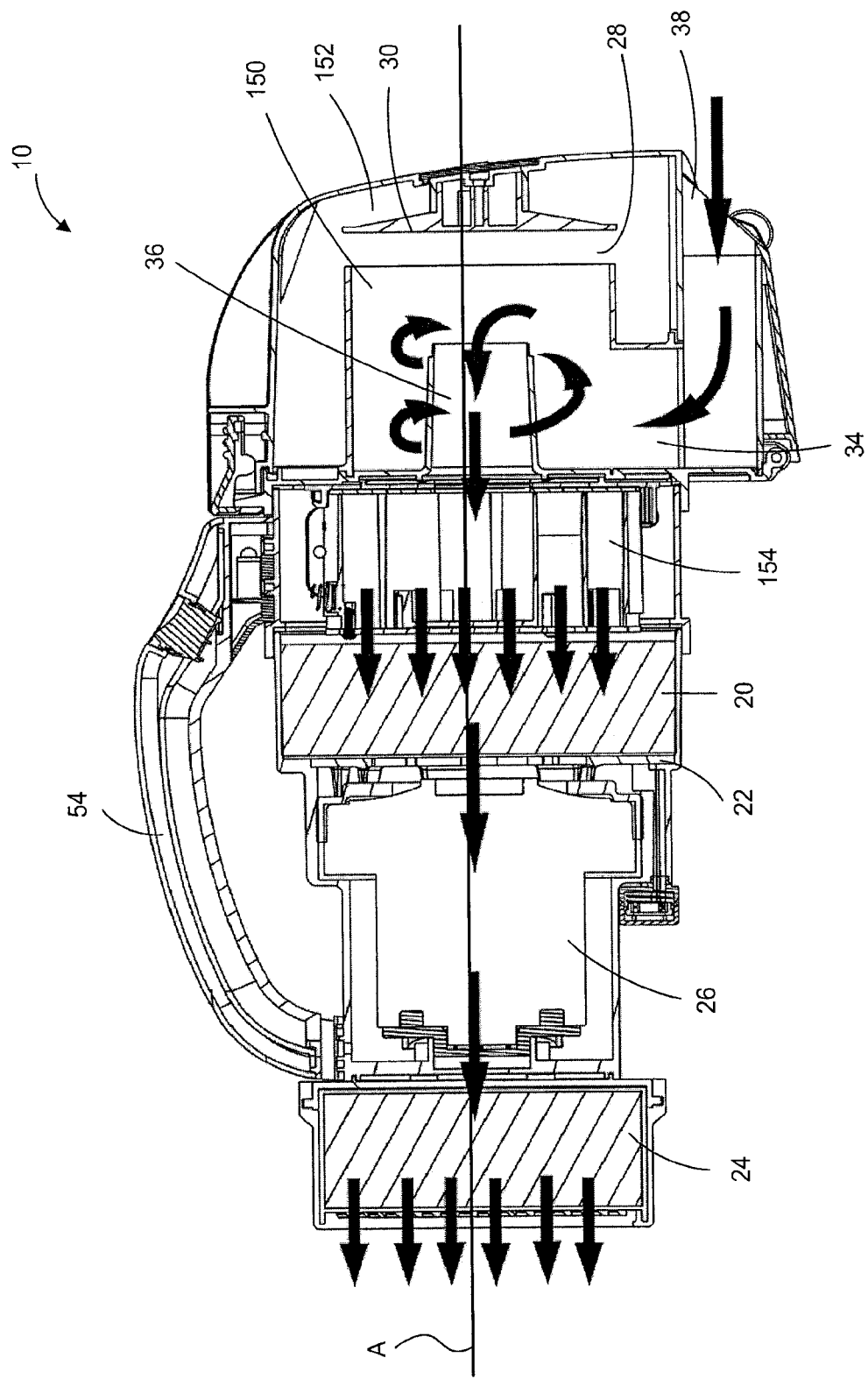
FIG. 7 is a longitudinal section through an alternate embodiment of a vacuum cleaner in accordance with this disclosure.

As shown in FIGS. 1-6, a surface cleaning apparatus comprises a vacuum cleaner 10 having at least one cyclone and a dirt collection chamber in communication with the cyclone dirt outlet. The filtration apparatus may be of any design or configuration. As exemplified, surface cleaning apparatus 10 has a first housing 12 and a second housing 14. First housing 12 comprises at least one cyclone 16 and a dirt collection chamber 18 and second housing 14 houses the filtration members and the suction motor. As shown in FIG. 7, a surface cleaning apparatus 10 has a first cyclonic cleaning stage comprising a single cyclone 150 having a dirt collection chamber 152 and a second cyclonic cleaning stage comprising a plurality of second stage cyclones 154 in parallel.

As exemplified in FIGS. 1-6, vacuum cleaner 10 comprises a hand held vacuum cleaner. Accordingly, vacuum cleaner 10 may be provided with handle 54, which is affixed to lid 32 and lid 58 of second housing 14. Handle 54 may alternately be affixed to any other portion or portions of vacuum cleaner 10 as is known in the art. Optionally, as exemplified, on/off switch 56 may be provided on handle 54. On/off switch 56 may alternately be provided on any other portion of vacuum cleaner 10.

As exemplified in FIG. 3, suction motor 26 is positioned in second housing 14, preferably with a suction fan provided below the electric motor. Clean air outlet 60 is provided downstream from suction motor 26. An optional post-motor filter may be provided downstream from suction motor 26, such as in post-motor filter housing 62, which may be accessible via post motor filter housing door 64, which could be pivotally mounted to second housing 14. It will be appreciated that, surface cleaning apparatus may be a vacuum cleaner, a carpet extractor, a bare floor cleaner or the like. As exemplified, the surface cleaning apparatus is hand held. However the surface cleaning apparatus may be configured as an upright vacuum cleaner, a stick vacuum cleaner, a canister vacuum cleaner, a backpack or shoulder strap vacuum cleaner or other configuration known in the art. The surface cleaning apparatus may have a single cyclonic cleaning stage, which may be of any construction known in the art, or a plurality of cyclonic cleaning stages, each of which may be of any construction known in the art, e.g. they may comprise a single cyclone or a plurality of cyclones in parallel.

In accordance with this disclosure, an openable dirt collection chamber 18 is provided that is in communication with the dirt outlet 28. Dirt collection chamber 18 has an openable end portion that comprises a wall that is intersected by the longitudinally extending axis of the cyclone. For example, the openable end portion may be floor 44 of cyclone 16 as exemplified in FIGS. 1-6, impingement member 30 and the floor of dirt collection chamber 18 to which impingement member 30 may be mounted as exemplified in FIGS. 7-8 or opposed wall 164 of dirt collection chamber 18 of FIGS. 12-13 or bottom 66 comprising cyclone floor 42 and dirt collection chamber floor 44 of FIGS. 9-11. When the end portion is in an open position as exemplified in FIGS. 5, 8 and 11 and 13, the cyclone chamber has an absence of any member having a larger diameter than the vortex finder whereby dirt collection chamber 18 and the cyclone 16 may be concurrently emptyable with dirt collection chamber 18.

A first embodiment of this disclosure is shown in FIGS. 1-6, which exemplifies the use of an inverted cyclone. However, as shown in other embodiments, it will be appreciated that the cyclone 16 may be of any configuration and orientation and need not be inverted (e.g., cyclone 16 may be a horizontally mounted cyclone or a vertically mounted upright cyclone with an upper air inlet, an upper air out and a lower dirt outlet). Accordingly, the reference to "upper" and "lower" and "floor" are for convenience in the following discussion and relate to a preferred embodiment.

Figure 3:
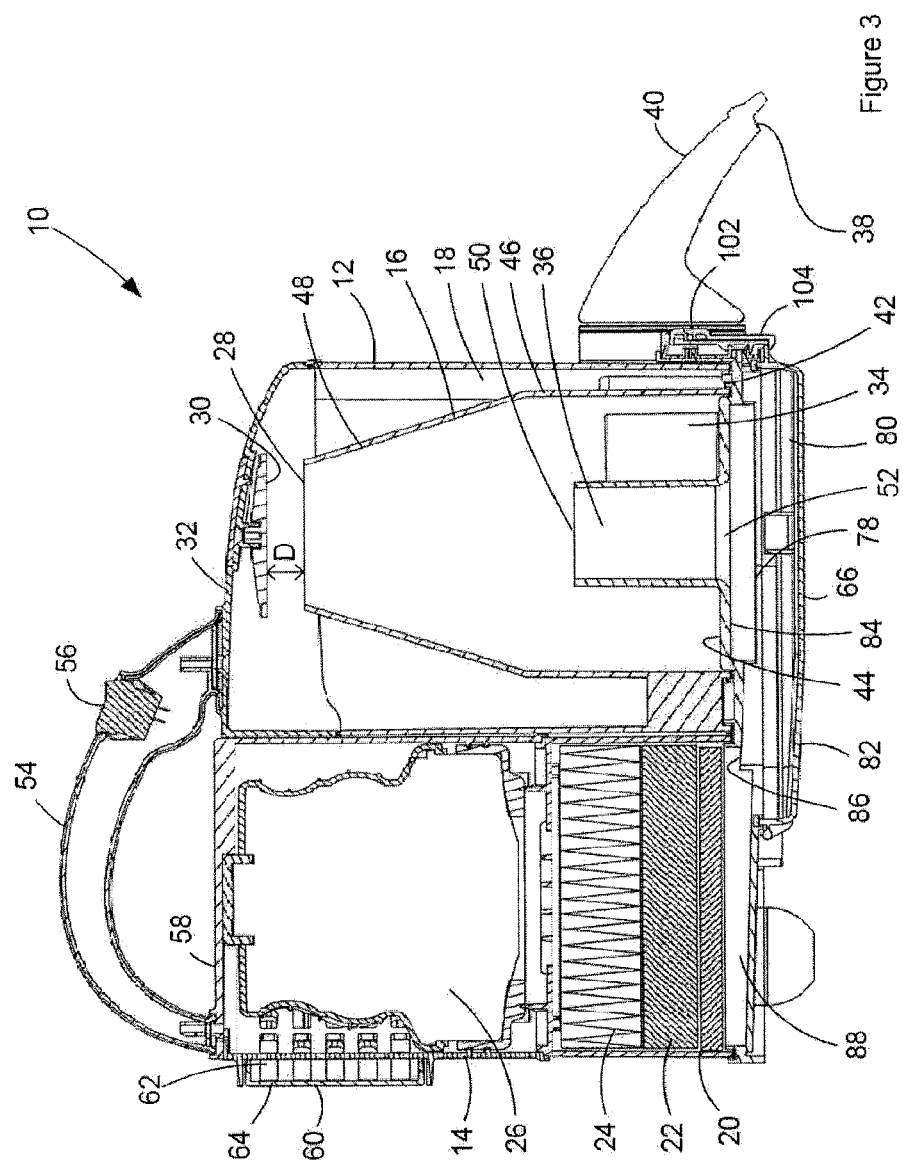
FIG. 3 is a cross-section along the line 3-3 in FIG. 2.
Figure 12:
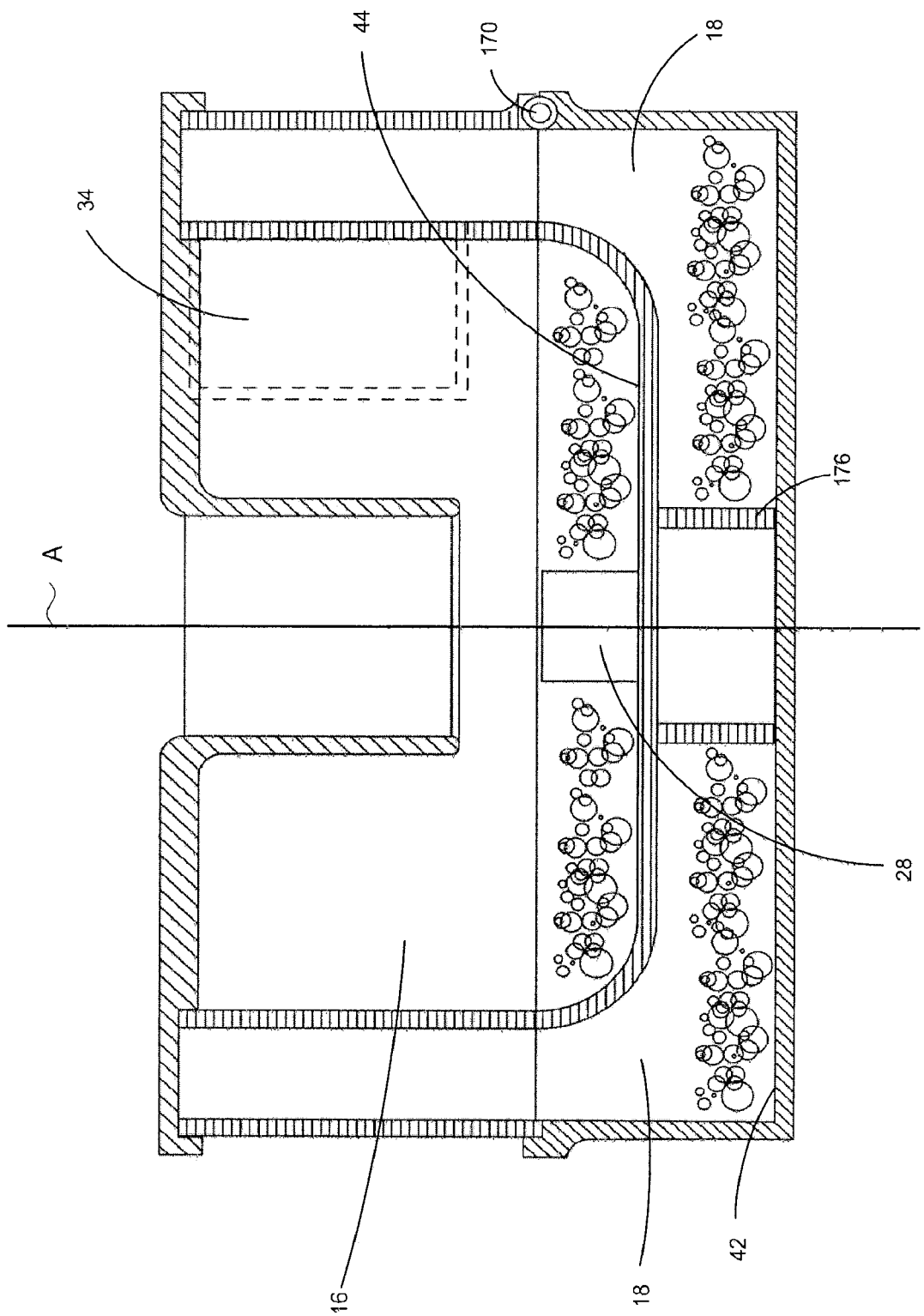
FIG. 12 is a cross-section through a further alternate embodiment of a cyclone and dirt collection chamber in accordance with this disclosure; and, FIG. 13 is a cross-section through the alternate embodiment shown in FIG. 12 wherein the cyclone floor and dirt collection chamber floor are open.
Figure 13:
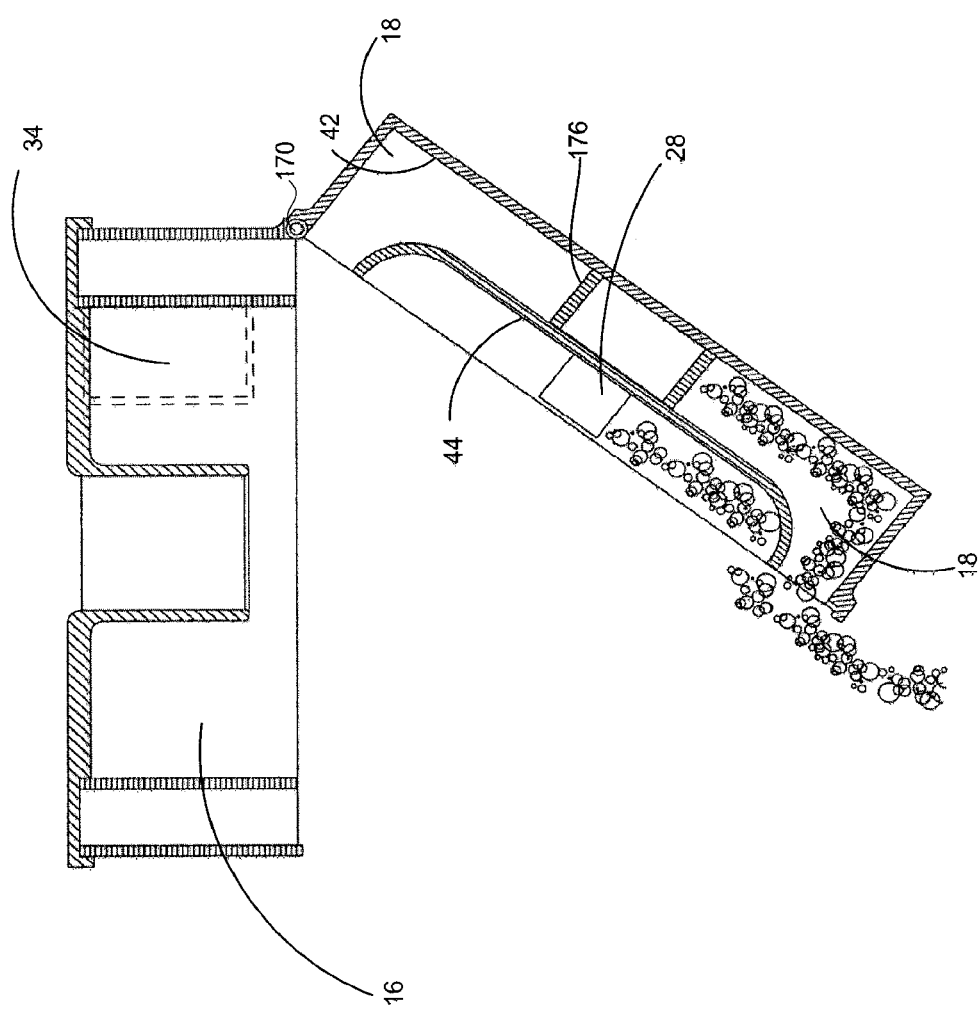

Referring to FIGS. 1-6, cyclone 16 has a dirt outlet 28 and an impingement surface 30 in dirt collection chamber 18 spaced from and facing dirt outlet 28. As shown in FIG. 3, optional impingement surface 30 is preferably spaced a distance D from outlet 28 wherein distance D may be up to 50 mm, preferably from 8 to 30 millimeters and, and more preferably from 12 to 25 millimeters. It will be appreciated that impingement member 30 may be mounted to lid 32 of dirt collection chamber 18 as exemplified. Alternately, impingement member may be mounted to a sidewall of dirt collection chamber 18 and/or cyclone 16. It will be appreciated that cyclone 16 may be in any particular orientation and/or any particular configuration. As exemplified in FIG. 7, cyclone 150 may have a longitudinally extending axis A that extends generally horizontally when the surface cleaning apparatus is in use. In such a case, impingement surface 30 may be positioned facing dirt outlet 28 and accordingly, in use, extends generally vertically, (i.e. transverse to longitudinal axis A). Alternately, as shown in FIGS. 12 to 13, an impingement surface may not be provided.

Figure 4:
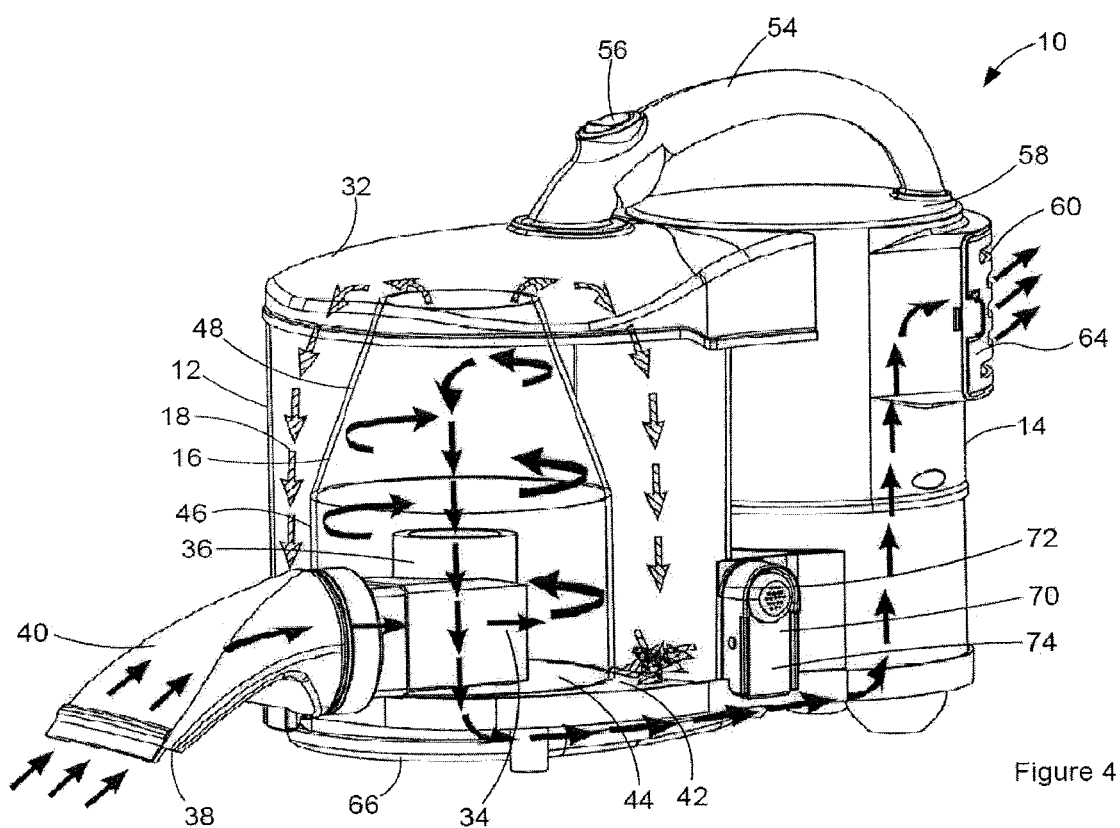
FIG. 4 is a schematic drawing of the vacuum cleaner of FIG. 1 showing the airflow passage therethrough.

As exemplified in FIG. 3, cyclone 16 is an inverted cyclone. Accordingly, cyclone 16 has a lower air inlet 34 and a lower air outlet 36. Air inlet 34 is positioned downstream from dirty air inlet 38 of surface cleaning nozzle 40. Surface cleaning nozzle 40 may be any surface cleaning nozzle known in the art. Air inlet 34 of cyclone 16 may be in airflow communication with surface cleaning nozzle 40 in any manner known in the art. The exact structure of surface cleaning nozzle 40 and the communication passage between surface cleaning nozzle 40 and air inlet 34 will vary depending if the surface cleaning apparatus is an upright vacuum cleaner, canister vacuum cleaner or, as exemplified, a portable hand held vacuum cleaner. In operation, air will enter cyclone 16 through inlet 34 and travel upwardly, as exemplified in FIG. 4. The air will then travel downwardly to exit cyclone 16 via outlet 36. As shown in FIG. 4 by the hatched arrows, dirt will exit upwardly through outlet 28 and deposit on dirt collection chamber floor 42. In addition, some of the heavier particulate matter may not be entrained in the air stream and may be deposited on cyclone floor 44.

In this embodiment, cyclone 16 has a longitudinally extending axis that extends through the centre of cyclone 16. The longitudinal axis is aligned with, and extends through, air outlet 36 and accordingly intersects floor 44 and door 82. In an alternate embodiment, it will be appreciated that cyclone 16 need not be inverted but may be of any configuration or orientation. As exemplified in FIGS. 7 and 8, cyclones 150, 154 may be oriented such that longitudinal axis A of the cyclones extends horizontally when the surface cleaning apparatus is in use. As exemplified in FIG. 7, cyclone 150 has an impingement member 30 that is generally vertical and faces dirt outlet 28 and is intersected by longitudinal axis A. Alternately, the cyclone may be an upright cyclone (see for example FIGS. 12 to 13) or a cyclone having a single direction of travel of the air. As exemplified in FIGS. 12 and 13, cyclone 16 has a longitudinal axis that intersects dirt collection chamber floor 42 and cyclone floor 44. As exemplified in FIGS. 9-11, cyclone 16 has a longitudinal axis that intersects cyclone floor 44.

As exemplified, cyclone 16 is a frustoconical cyclone having cylindrical portion 46 and frustoconical portion 48. Alternately, or in addition to the orientation of cyclone 16, it will be appreciated that cyclone 16 may be cylindrical, entirely frustoconical or any other shape known in the art. As shown in FIGS. 9-13, cyclone 16 may be closed, i.e. have a portion that closes the dirt outlet end of the cyclone chamber, and is provided with at least one dirt outlet 28. The dirt exit end may be bowl shaped, e.g., rounded.

As exemplified in FIG. 3, outlet 36 of cyclone 16 comprises a vortex finder that extends inwardly into the cyclone chamber defined by cyclone 16. Outlet 36 preferably comprises a generally cylindrical passage having an inlet 50 and an outlet 52. It will be appreciated that, in an alternate embodiment any outlet or vortex finder known in the art for cyclones may be utilized.

In any embodiment, inlet 50 may be covered by a screen, shroud or filter as is known in the art. However, it is preferred that vortex finder 36 is unobstructed, i.e., no screen, shroud or filter is provided on inlet 50.

Accordingly, as exemplified in FIG. 3, vortex finder 36 is not surrounded by a screen, shroud or filter and no physical separation member is positioned in the cyclone chamber of cyclone 16. Accordingly, no filtration or screen member interior of cyclone 16 requires cleaning. Elongate material such as hair or fibre can become adhered to a shroud, requiring the shroud to be manually cleaned. Preferably, a screen is positioned downstream from cyclone 16 and upstream from the pre-motor filter. For example, a screen 78 is preferably provided (see for example FIG. 3). The material that would otherwise clog a screen or shroud that surrounds inlet 50 may be retained by optional screen 78 which may be larger than a screen in a cyclone chamber.

While the use of the impingement member is exemplified in a surface cleaning apparatus having side-by-side housings 12, 14, it will be appreciated that this design may be used in any vacuum cleaner configuration, such as shown in FIG. 7. In other embodiments, an impingement member may not be provided. For example, in the example of FIGS. 1-6, an impingement member may not be provided. See also FIGS. 9-13 wherein an impingement member is not provided.

In accordance with a preferred embodiment of this disclosure, dirt collection chamber 18 surrounds at least a portion of and, as exemplified, preferably all of cyclone 16 and is preferably external to the cyclone chamber defined by cyclone 16. Accordingly, cyclone 16 may be positioned in dirt collection chamber 18 and, preferably, generally centrally therein. An advantage of this design is that the bottom of cyclone 16 (e.g., floor 44) may be continuous with the bottom of dirt collection chamber 18 (e.g., floor 44) so that a simplified construction is provided that permits both cyclone 16 and dirt collection chamber 18 to be opened at the same time.

The following description refers to the embodiment of FIGS. 1-6 wherein the openable end of the dirt collection camber is the dirt collection surface (floor 42). However, in an alternate embodiment, it will be appreciated that the openable portion need not be the dirt collection surface. For example, if cyclone 16 is mounted horizontally, then the openable portion may be opposed wall 164 of dirt collection chamber 18 facing dirt outlet 28 to which impingement member 30 is attached. In such a case, the dirt collection surface will be a sidewall of dirt collection chamber 18.

In accordance with the preferred embodiment of FIGS. 1-6, vacuum cleaner 10 is preferably configured such that floor 44 forms an openable end portion of cyclone 16 and floor 42 forms an openable end portion of dirt collection chamber 18. Floor 44 is a moveable cyclone dirt collection surface and floor 42 is a moveable dirt collection chamber surface. The openable portion of cyclone 16 is accordingly opened when the openable portion of dirt collection chamber 18 is opened. Accordingly, dirt collected on floor 44 of cyclone 16 is emptied at the same time as dirt collected on floor 42 of dirt collection chamber 18. Accordingly, floor 42 and floor 44 are both moveable and connected to each other whereby both floor 42 and 44 are concurrently moveable such that dirt collection chamber 18 and cyclone 16 are concurrently emptied.

As exemplified in FIG. 5, floors 42 and 44 comprise a wall intersecting the longitudinally extending axis of the dirt collection chamber 18 and cyclone 16. Floors 42 and 44 may comprise a pivoting bottom or end portion of first housing 12 and, alternately, of the filtration apparatus (e.g. housings 12 and 14 of this embodiment). It will be appreciated that in other embodiments, floors 42 and 44 may be otherwise openable and may be removably mounted. For example, they may be slidably, translatably or removably mounted (e.g., by a screw mount, a bayonet mount or a snap fit) to cyclone 16 and dirt collection chamber 18.

As exemplified in FIG. 5, outlet 36 is in some embodiments preferably provided as part of floor 42, and is preferably integrally molded therewith. Accordingly, when floors 42 and 44 are in the open position, vortex finder 36, and any shroud or the like mounted thereon, is removed from cyclone 16. Accordingly, the cyclone chamber has an absence of any member having a larger diameter than the vortex finder therein. Accordingly, the dirt will fall out of collection chamber 16 and cyclone 16 and will fall downwardly off of floors 42 and 44.

Figure 1:
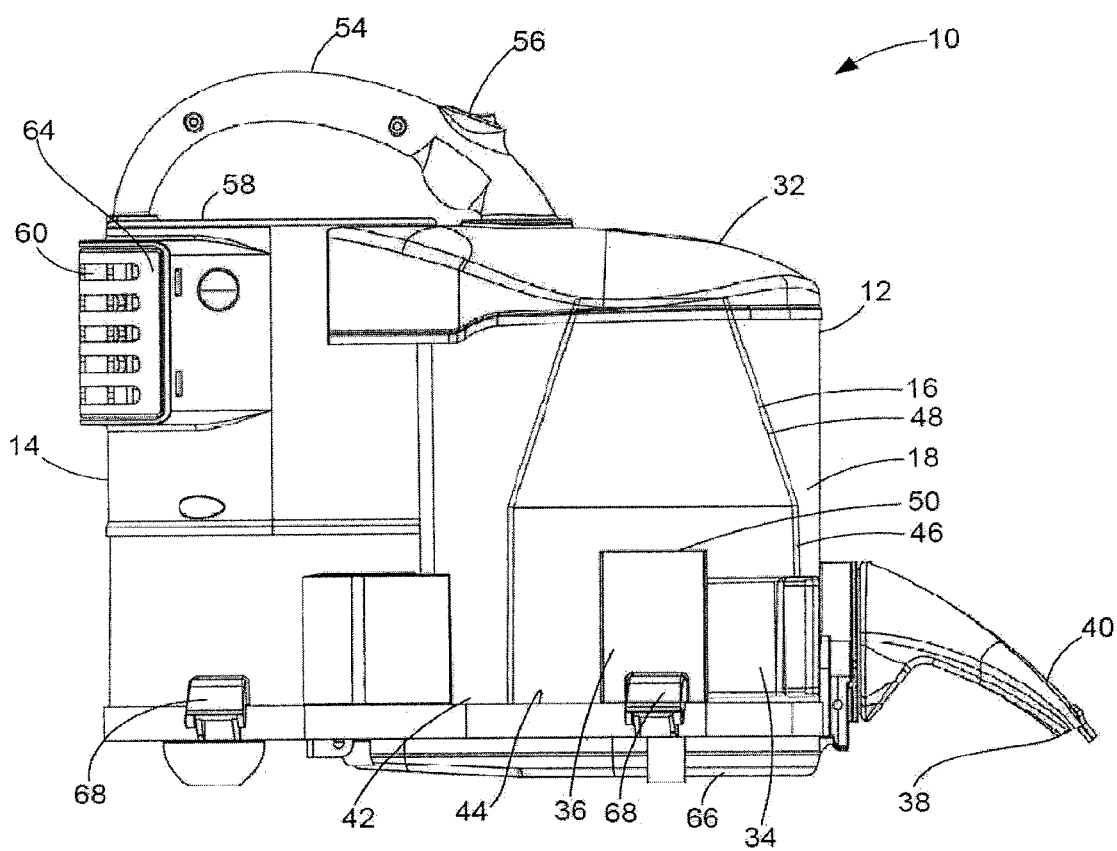
FIG. 1 is a side elevational view of a preferred embodiment of a vacuum cleaner in accordance with this design wherein the outer casing surrounding the cyclone and forming an outer wall of a dirt collection chamber is optionally transparent.
Figure 2:
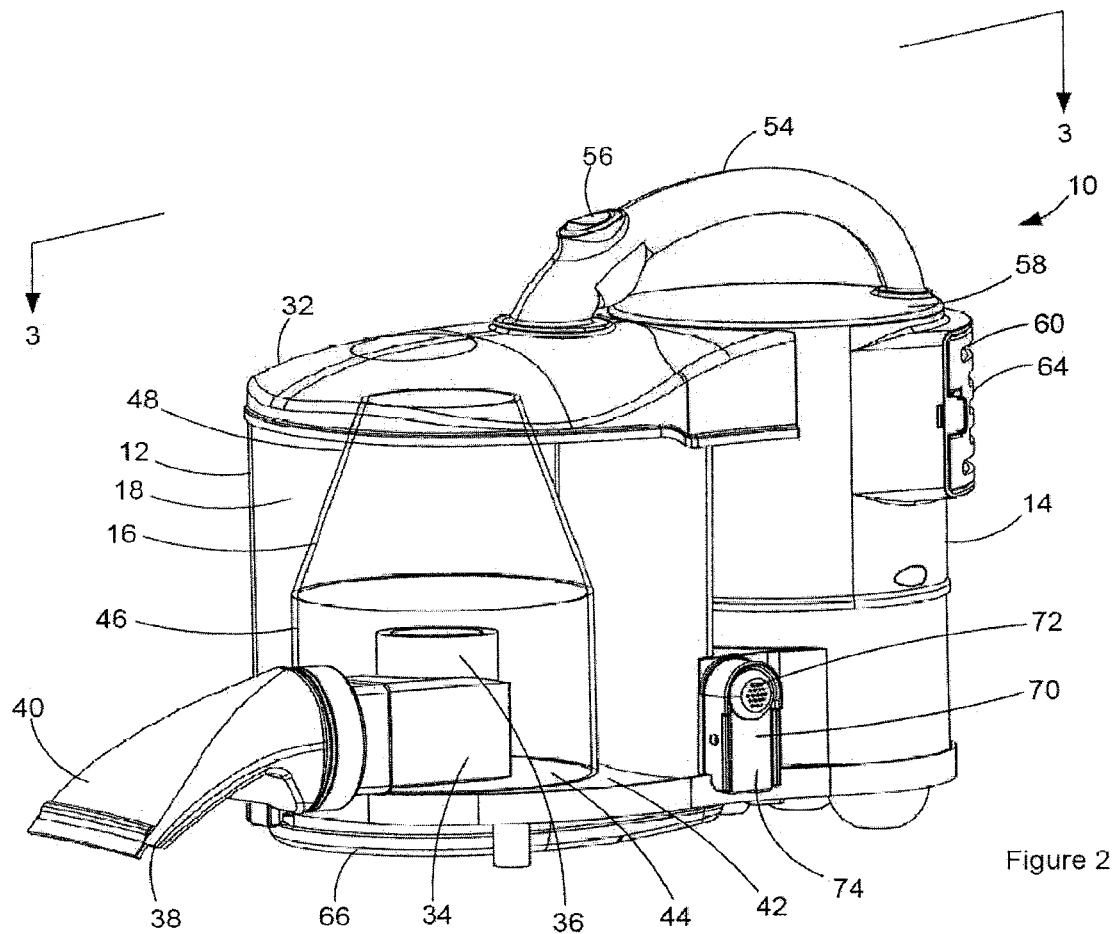
FIG. 2 is a perspective view from the front and the right side of the vacuum cleaner of FIG. 1.

Accordingly, as seen in FIG. 5, both cyclone 16 and dirt collection chamber 18 are openable and may be emptied concurrently when floors 42 and 44 are in the open position by holding vacuum cleaner 10 in the upright position (as shown in FIG. 1).

It will be appreciated that dirt collection chamber 18 may be spaced from cyclone 16 provided dirt outlet 28 is in communication with dirt collection chamber 18 so that dirt which is disentrained from the fluid flow in cyclone 16 is conveyed to dirt collection chamber 18. It will be appreciated that floor 42 may open separately from floor 44, such that cyclone 16 and dirt collection chamber 18 may be individually opened.

As shown in FIG. 5, housings 12 and 14 may have a pivoting bottom 66, which is secured to each of housings 12 and 14 by a pivot 68. In the closed position exemplified in FIGS. 1 and 4, pivoting bottom 66 is secured in position by latch 70. Latch 70 may have a button 72 which, when pressed, causes arm 74 to move outwardly thereby disengaging a flange provided on the bottom end of arm 74 from flange 76 provided on pivoting bottom 66. A gasket or other sealing member may be provided at the interface of housings 12 and 14 and pivoting bottom 66 to provide an air tight or fluid tight seal. It will be appreciated that bottom 66 may be moveable in any other direction by any other means known in the art and may optionally be removable from housings 12, 14. Further, bottom 66 may be moveably secured in position by any other means known in the art and need not be connected to surface cleaning apparatus 10 for relative motion thereto.

In an alternate embodiment of FIGS. 1-6, it will be appreciated that only floors 42 and 44 may be pivotally mounted to housing 12. In such an embodiment, foam filter 20 may remain sealed when cyclone 16 and dirt collection chamber 18 are emptied. In an alternate embodiment, a side-by-side housing design as exemplified in FIG. 1 need not be utilized. In such a case, floor 42 and floor 44 may comprise the entire floor of the filtration assembly, see for example, FIGS. 9-11.

If bottom 66 opens both housings 12 and 14, then it will be appreciated that dirt positioned on the upstream surface of filter 20 will be emptied when bottom 66 is opened.

Figure 8:
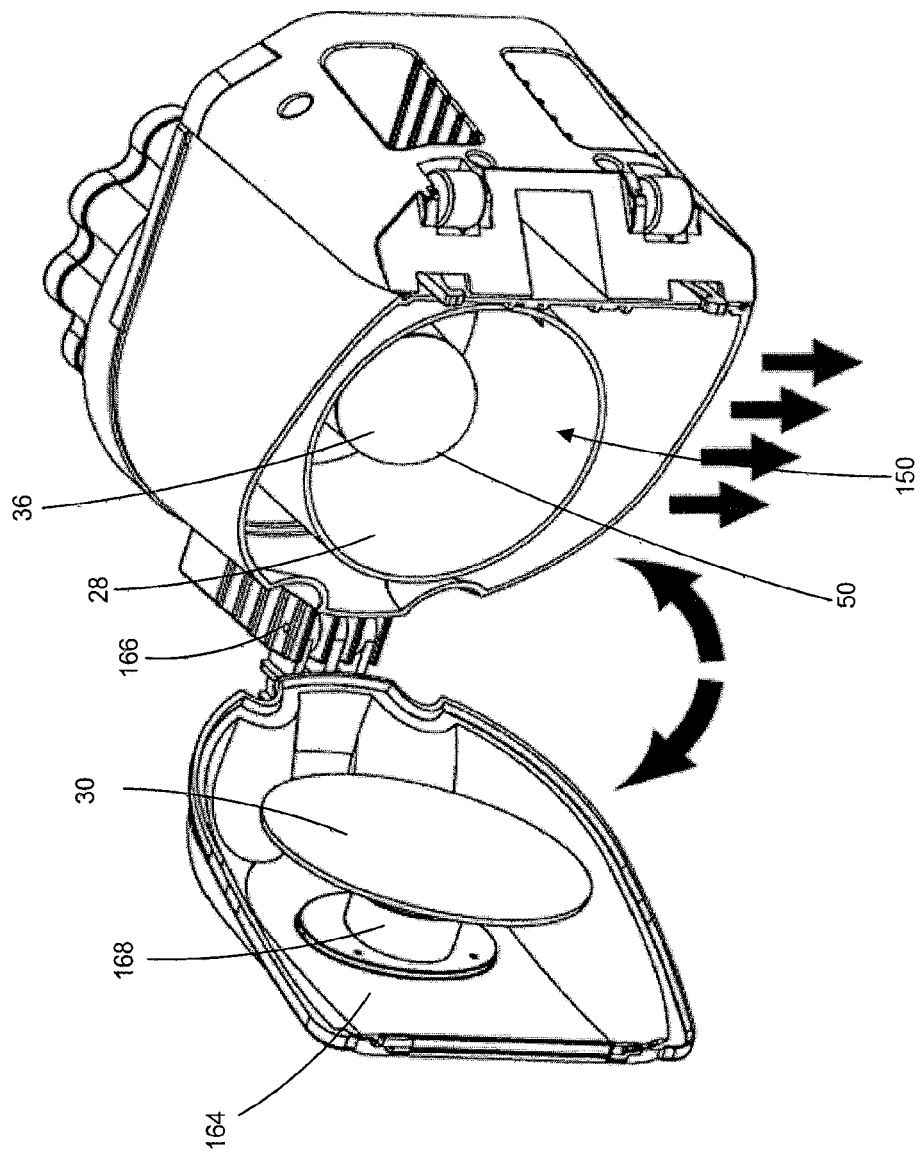
FIG. 8 is a perspective end view of the vacuum cleaner of FIG. 8 wherein the dirt collection chamber and the cyclone are open.

In the alternate embodiment of FIGS. 7 and 8, impingement member 30 is removed from the vicinity of dirt outlet 28 when opposed wall is opened, e.g., by pivoting about pivot pin 66. As exemplified, impingement member 30 is mounted to support 166 that is preferably mounted to opposed wall 164. It will be appreciated that impingement member 30 may be otherwise moveably mounted. When opposed wall is opened, the cyclone chamber is opened and both cyclone 150 and dirt collection chamber 152 may be concurrently emptied. In this embodiment, vortex finder 36 remains in position in the cyclone chamber. While a screen may be positioned to overlie inlet end 50 of vortex finder 36, it will be appreciated that a member having a diameter larger than vortex finder 36 is absent from the interior of cyclone 150 thereby permitting dirt to be unimpeded when cyclone 150 is held open over a garbage can.

Figure 9:
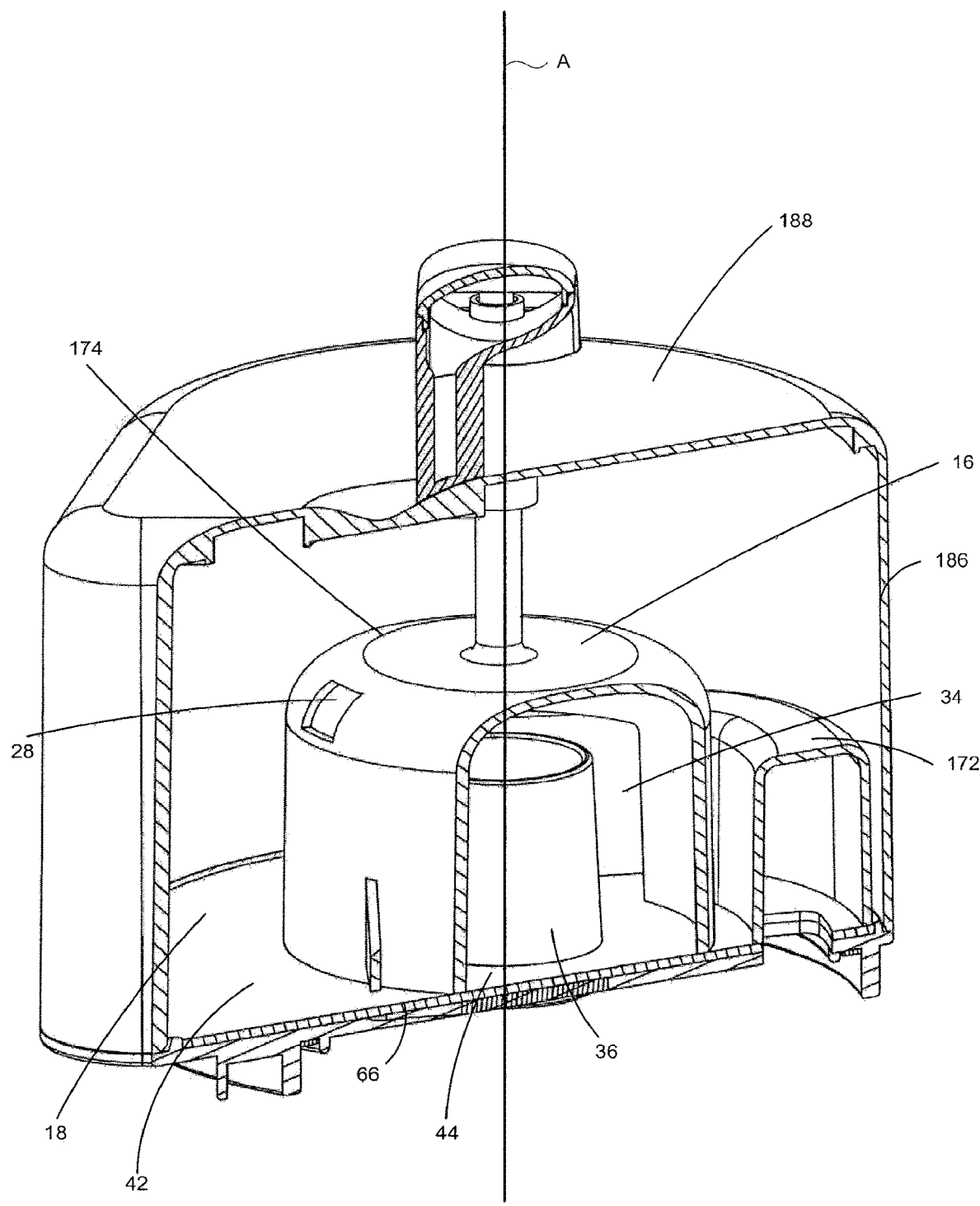
FIG. 9 is a perspective cross-section view of a further alternate embodiment of a cyclone and dirt collection chamber in accordance with this disclosure.
Figure 10:
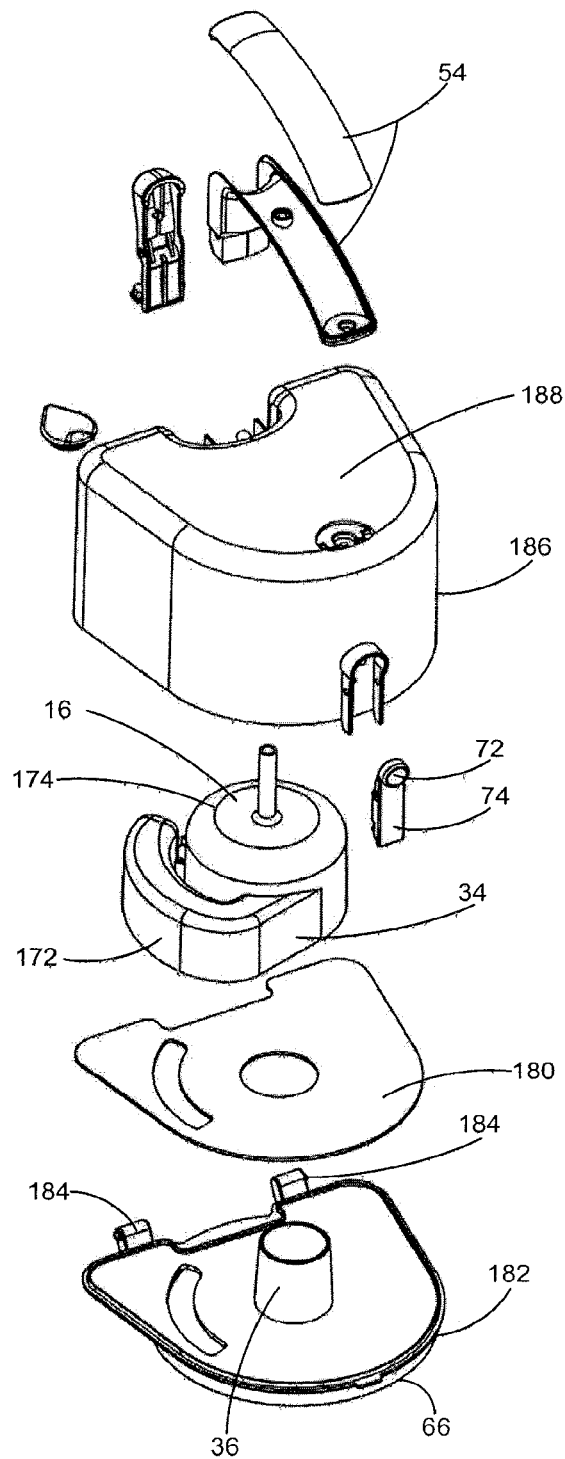
FIG. 10 is an exploded perspective view of the alternate embodiment shown in FIG. 9; and, FIG. 11 is a perspective view from the bottom of the cyclone and dirt collection chamber shown in FIG. 9 wherein the bottom panel is open.
Figure 11:
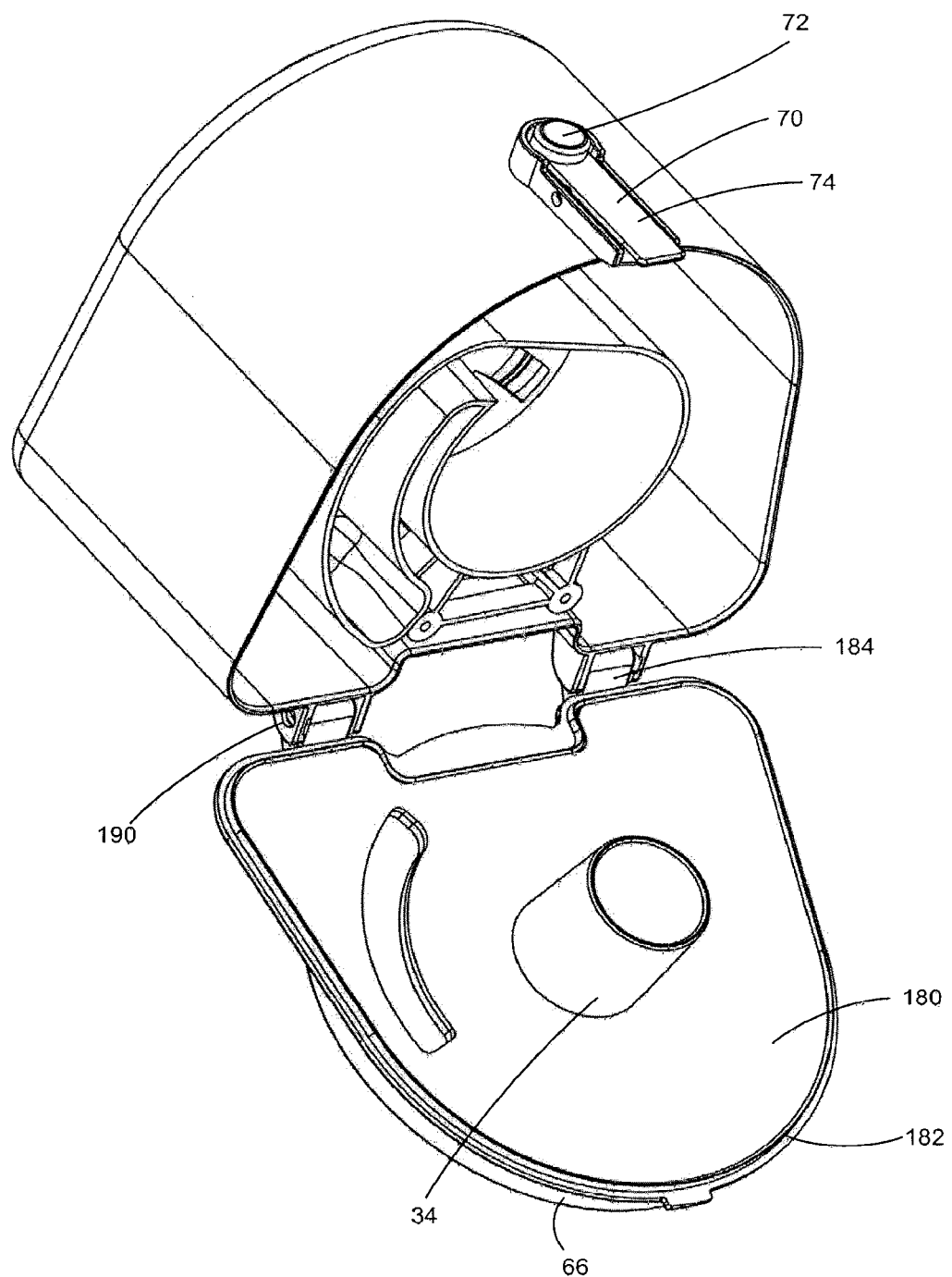

In the alternate embodiment of FIGS. 9-11, cyclone 16 has a closed end and is opened at the closed dirt outlet end for emptying. As exemplified, in FIGS. 9-11, cyclone 16 has tangential passage 172 that is in airflow communication with a surface cleaning nozzle (not shown). Tangential passage 172 is connected to air inlet 34 of cyclone 16. Cyclone 16 has a clean air outlet 36 in floor 44, similar to the embodiment of FIGS. 1-6. Cyclone 16 has a closed end wall 174 with at least one dirt outlet 28 in a side wall thereof. Dirt outlet 28 opens to dirt collection chamber 18. The outer walls of dirt collection chamber 18 are formed from sidewall 186 and end wall 188. Bottom wall 182 comprises floors 44 and 42. A gasket 180 may be provided at the interface of dirt collection chamber 18, cyclone 16 and bottom panel 182 to provide an air tight or fluid tight seal.

In operation, dirty air enters cyclone 16 tangentially via air inlet 34 and swirls upwardly. Heavier dirt particles fall out of the air stream and are deposited on floor 44 of bottom panel 182. Some dirt particles will exit cyclone 16 via dirt outlet 28, fall downwardly in dirt collection chamber 18 and deposit on floor 42 of bottom panel 182.

As exemplified in FIGS. 9-11, bottom panel 182 comprises a wall intersecting the longitudinally extending axis A of dirt collection chamber 18 and cyclone 16. Accordingly, bottom panel 182 forms the end portion of dirt collection chamber 18 and cyclone 16. Bottom panel 182 may have a flange 184 connected to a flange 190 on sidewall 186. Accordingly, bottom panel 182 is rotatably moveable such that cyclone 16 and dirt collection chamber 18 may be opened to empty deposited dirt particles. When bottom panel 182 is in the open position, the cyclone chamber has an absence of any member having a larger diameter than the vortex finder.

In the alternate embodiment of FIGS. 12-13, floors 42 and 44 comprise the openable end portion. Cyclone floor 44 is mounted to dirt collection chamber 18, such as by support 176. Accordingly, when dirt collection chamber 18 is opened, such as by rotating about pivot 170, cyclone 16 is also opened.

In any embodiment as exemplified in FIGS. 1-6, a filtration member may be provided adjacent outlet 36 and, preferably, in sealing engagement with outlet 52. Referring to FIG. 3, filtration member 78 may be positioned on rear surface 84 of floor 44 and overlies outlet 52. Accordingly, air that exits outlet 36 travels through filtration member 78. The air then travels through filtration chamber 80 and travels laterally to outlet 86, which is in air flow communication with headspace 88 below filter 20. An advantage of such an embodiment is that a screen, shroud or filter need not be provided inside cyclone 16 overlying inlet 52 of vortex finder 36. Accordingly, if a vortex finder remains in cyclone 16 when it is opened, such as in FIGS. 7-8 and 12-13, then a large diameter member that may impede dirt from falling out need not be provided in cyclone 16.

Preferably, filtration member 78 preferably comprises a screen, such as an open mesh screen, e.g., a wire mesh screen or, alternately, a plastic mesh screen.

An access door 82 may be provided to permit access to filtration member 78 such that filtration member 78 may be cleaned. Access door may be any door that is movably mounted in overlying relationship to filtration chamber 80. As exemplified in FIG. 6, access door 82 is pivotally mounted by pivot 90 to pivoting bottom 66, and is secured in position by a latch 120. Latch 120, for example, may have a button 122 which, when pressed, causes arm 124 to move outwardly thereby disengaging a flange on the bottom end of arm 124 from flange 92 provided on the front end of access door 82. A sealing gasket or other sealing member known in the art may be utilized to provide an air tight or fluid tight seal for filtration chamber 80. Any other securing member known in the art may be used. Further, door 82 may be removable and need not be connected to surface cleaning apparatus 10 for relative motion thereto.

Preferably, filtration member 78 is mounted and, more preferably, movably mounted and, most preferably, removably mounted to access door 82. As shown in FIG. 6, filtration member 78 is pivotally mounted to the inner surface of access door 82. Accordingly, when a user desires to clean filtration member 78, it may be pivoted in the direction shown by arrow A in FIG. 6 to an open or cleaning position. It will be noticed that access door 82 may be opened independently of pivoting bottom 66. In an alternate embodiment, it will be appreciated that a pivoting bottom 66 need not be provided.

Preferably, at least a portion of and, more preferably, all of access door 82 is transparent. Accordingly, a user may lift the vacuum cleaner, invert the vacuum cleaner or tilt the vacuum cleaner on its side to view filtration member 78 and determine whether filtration 78 requires cleaning or, alternately, replacement.

In accordance with any embodiment of this disclosure, a series of screening and filtration members may be used in series downstream from the cyclone chamber of cyclone 16. In accordance with this preferred embodiment, the screening and filtration members comprise a screen 78, which is preferably positioned adjacent outlet 36, a foam filter 22 downstream from screen 78, a felt filter 22 downstream from foam 20 and a HEPA filter 24 downstream from felt filter 22. Preferably, all of these filters are positioned upstream from suction motor 26. Alternately, one or more of these filters may be positioned downstream from suction motor 26. In particular HEPA filter 24 may be downstream from suction motor 26. Accordingly, a plurality of screening and filtration members, each of which have a finer filtration capacity (e.g. smaller pores) are provided in series in the downstream direction. Optionally, a shroud (e.g. a perforated or apertured plastic cover) may be provided surrounding or overlying inlet 50 of outlet 36.

It will be appreciated that the end portion may be openable by any means known in the art. For example, it may be translatable, slidable or removably mounted, such as by a screw or bayonet mount or a snap fit. Preferably, it is not removably mounted, but remains affixed to the filtration housing when opened, such as by being pivotally mounted as exemplified.

It will be appreciated that the end portion may be oriented such that it is the lower portion of the dirt collection chamber 18 (e.g. FIGS. 1-6 and 9-13) and accordingly comprises a dirt collection surface. However, it need not be, provided that it intersects the longitudinal axis of the cyclone (e.g. FIGS. 7-8).

It will be appreciated that the end portion may be distal to dirt outlet 28 (e.g., FIGS. 1-6 and 9-11) or may face dirt outlet 28 (e.g., FIGS. 7-10).

It will also be appreciated that any of the aforementioned embodiments may be used singly or in any particular combination or sub-combination of the remaining features listed above.

Although the disclosure has been described in conjunction with specific embodiments thereof, if is evident that many alternatives, modifications and variations will be apparent to those skilled in the art. Accordingly, it is intended to embrace all such alternatives, modifications and variations that fall within the spirit and broad scope of the appended claims. In addition, citation or identification of any reference in this application shall not be construed as an admission that such reference is available as prior art to the present disclosure.

What is claimed is:

1. A hand held carriable surface cleaning apparatus having an upper end, a lower end, a rear end and a front end, the hand held surface cleaning apparatus comprising:
    a) an air flow path extending from a dirty air inlet to a clean air outlet;
    b) a first cyclonic cleaning stage comprising a cyclone downstream from the dirty air inlet, the cyclone defining a cyclone chamber having a lower air inlet, a lower air outlet and an upper dirt outlet and an openable dirt collection chamber, the dirt collection chamber in communication with the upper dirt outlet;
    c) a suction motor positioned in the air flow path;
    d) a handle provided on the upper end of the hand carriable surface cleaning apparatus, the handle extending forwardly from the rear end of the hand carriable surface cleaning apparatus whereby the handle overlies at least a portion of the first cyclonic cleaning stage and the suction motor, the handle having an actuator provided thereon; and,
    e) a filter positioned directly below the cyclone air outlet wherein the handle has outer perimeter extending between a front end of the handle and a rear end of the handle, a front section having a front section outer perimeter, a central section having a central section outer perimeter and a rear section having a rear section outer perimeter, and each of the front section outer perimeter, the central section outer perimeter and the rear section outer perimeter has an equal length in a forward rearward direction, and
    wherein, the suction motor has a center provided between a front end and a rear end of the suction motor, the rear end of the handle is at the rear end of the suction motor and the central section of the handle overlies the center of the suction motor.

2. The hand carriable surface cleaning apparatus of claim 1, further comprising a nozzle and the dirty air inlet is located at an inlet end of the nozzle.

3. The hand carriable surface cleaning apparatus of claim 2, wherein the lower air inlet comprises a tangential air inlet having an inlet end that faces an outlet end of the nozzle.

4. The hand carriable surface cleaning apparatus of claim 1, wherein the dirt collection chamber has a lower openable end portion that comprises a dirt collection surface.

5. The hand carriable surface cleaning apparatus of claim 1, wherein the cyclone has a lower openable end portion, the lower openable end portion of the cyclone comprising a cyclone dirt collection surface.

6. The hand carriable surface cleaning apparatus of claim 4, wherein the cyclone has a lower openable end portion, the lower openable end portion of the cyclone comprising a cyclone dirt collection surface, and the lower openable end portion of the cyclone is openable concurrently with the lower openable end portion of the dirt collection chamber.

7. The hand carriable surface cleaning apparatus of claim 1, further comprising a nozzle positioned upstream of the dirty air inlet and a housing in which the suction motor is provided, wherein the cyclone chamber is positioned between the suction motor housing and the nozzle.

8. The hand carriable surface cleaning apparatus of claim 1, further comprising a housing in which the suction motor is provided and the handle is affixed to the housing.

9. The hand carriable surface cleaning apparatus of claim 1, wherein the suction motor has a longitudinal motor axis, the cyclone has a longitudinal cyclone axis, and the motor axis and the cyclone axis are parallel.

10. The surface cleaning apparatus of claim 1 wherein the hand held surface cleaning apparatus has a center provided between the front end and the rear end of the hand held surface cleaning apparatus and the center of the hand grip portion is positioned rearward of the center of the hand held surface cleaning apparatus.

11. A surface cleaning apparatus having an upper end, a lower end, a rear end and a front end, the surface cleaning apparatus comprising:
    a) an air flow path extending from a dirty air inlet to a clean air outlet;
    b) a first cyclonic cleaning stage comprising an cyclone downstream from the dirty air inlet, the cyclone defining a cyclone chamber having a longitudinally extending axis, a lower cyclone air inlet, a lower cyclone air outlet, an upper dirt outlet;
    c) an openable dirt collection chamber in communication with the dirt outlet, the dirt collection chamber having a lower openable end portion that comprises a dirt collection surface;
    d) a suction motor positioned in the air flow path;
    e) a handle provided on the upper end of the first cyclonic cleaning stage, the handle extending from the rear end of the surface cleaning apparatus forwardly to overlie at least a portion of the first cyclonic cleaning stage; and,
    f) a filter positioned directly below the cyclone air outlet wherein the handle has outer perimeter extending between a front end of the handle and a rear end of the handle, a front section having a front section outer perimeter, a central section having a central section outer perimeter and a rear section having a rear section outer perimeter, and each of the front section outer perimeter, the central section outer perimeter and the rear section outer perimeter has an equal length in a forward rearward direction, and
    wherein, the suction motor has a center provided between a front end and a rear end of the suction motor, the rear end of the handle is at the rear end of the suction motor and the central section of the handle overlies the center of the suction motor.

12. The surface cleaning apparatus of claim 11, wherein the dirt collection chamber is positioned exterior of the cyclone chamber.

13. The surface cleaning apparatus of claim 11, wherein the surface cleaning apparatus further comprises a nozzle provided on a front end of the surface cleaning apparatus and having an outlet end aligned with the dirty air inlet.

14. The surface cleaning apparatus of claim 11, further comprising a housing in which the suction motor is provided and the handle extends forwardly from the housing to a housing of the first cyclonic cleaning stage.

15. The surface cleaning apparatus of claim 14 wherein the surface cleaning apparatus has a center provided between the front end and the rear end of the surface cleaning apparatus and the center of the hand grip portion is positioned rearward of the center of the surface cleaning apparatus.

* * * * *